United States Patent
Hayakawa et al.

(10) Patent No.: US 8,299,690 B2
(45) Date of Patent: Oct. 30, 2012

(54) STATOR STRUCTURE AND ROTATING ELECTRICAL MACHINE USING THE SAME

(75) Inventors: Yukihiko Hayakawa, Kofu (JP); Tokuro Kusunoki, Koshu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 335 days.

(21) Appl. No.: 12/659,736

(22) Filed: Mar. 19, 2010

(65) Prior Publication Data

US 2010/0237726 A1   Sep. 23, 2010

(30) Foreign Application Priority Data

Mar. 23, 2009 (JP) ................................ 2009-070694
Nov. 30, 2009 (JP) ................................ 2009-270901

(51) Int. Cl.
*H02K 5/00* (2006.01)
*H02K 1/06* (2006.01)

(52) U.S. Cl. .......... 310/400; 310/216.008; 310/216.009; 310/402

(58) Field of Classification Search ............ 310/58–59, 310/60 F, 64, 216.004, 216.008, 216.009, 310/216.014, 216.055, 216.056, 216.057, 310/216.058, 405, 407, 413, 400, 402
See application file for complete search history.

(56) References Cited

U.S. PATENT DOCUMENTS

| | | | | |
|---|---|---|---|---|
| 6,476,533 B2 * | 11/2002 | Akutsu et al. | .......... | 310/216.003 |
| 6,737,785 B2 * | 5/2004 | De Luca et al. | ........ | 310/216.084 |
| 2006/0284511 A1 * | 12/2006 | Evon et al. | .................. | 310/216 |

FOREIGN PATENT DOCUMENTS

| | | | |
|---|---|---|---|
| GB | 2059177 A | * | 4/1981 |
| JP | U H06-60284 | | 8/1994 |
| JP | 2004-266982 | | 9/2004 |

* cited by examiner

Primary Examiner — Tran Nguyen
(74) Attorney, Agent, or Firm — Manabu Kanesaka (57) ABSTRACT

The invention provides a rotating electrical machine provided with stable rotation characteristics for enabling each core to be reliably fixed in arranging a plurality of cores annularly around the rotor even when the dimensional error occurs in manufacturing accuracy of each core, causing each division core itself to enhance the cooling property, and resolving instability of magnetic reluctance between division cores, where the rotating electrical machine has a plurality of stator cores obtained by laminating electromagnetic steel plates, winding coils wound around the stator cores via insulators, a pair of first and second bracket members that hold the plurality of stator cores from the front and back in the rotary shaft direction of the magnet rotor, and a fastening member that couples the first and second bracket members, in the first bracket member is formed a first contact surface for striking one end face of each of the stator cores to regulate so as to arrange the plurality of stator cores annularly, in the second bracket is formed a second contact surface for striking the other end faces of the stator cores to regulate, the first contact surface constitutes a reference plane to align one end faces of the plurality of stator cores on the same plane, the second contact surface is formed of a deformation surface deformable to follow the other end faces of the plurality of stator cores, and at least one of the pair of first and second brackets is formed of a ring-shaped magnetic material for magnetically coupling between the division cores.

12 Claims, 9 Drawing Sheets

STATOR STRUCTURE AND ROTATING ELECTRICAL MACHINE USING THE SAME

RELATED APPLICATIONS

The present application is based on, and claims priorities from, Japanese Applications No. JP2009-070694, filed Mar. 23, 2009 and No. 2009-270901, filed Nov. 30, 2009, the disclosure of which is hereby incorporated by reference herein in its entirety.

BACKGROUND OF THE INVENTION

The present invention relates to a stator structure of electromagnetic motors, generators, etc. and rotating electrical machines using the stator structure, and more particularly, to improvements in a fixing structure of a stator provided with coils.

Generally, a rotating electrical machine such as a DC motor and generator is comprised of a rotor provided with a rotary shaft and a stator, and in inner rotor type rotating electrical machines, such a structure is widely known that a magneto rotor is rotatably supported axially by a housing and that stator coils are arranged in the shape of a ring around the periphery of the rotor.

Figure 10:
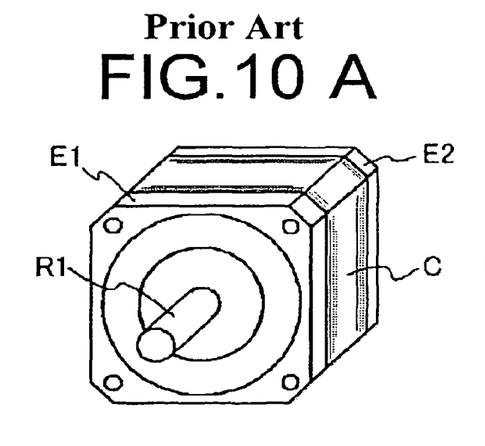
FIG. 10A is a perspective view of a conventional rotating electrical machine.
FIG. 10B is a sectional plan view of the conventional rotating electrical machine.

As shown in FIG. 10A, a rotating electrical machine is generally known which has an appearance such that a stator core C is nipped in a sandwich form between a pair of end brackets E1, E2 made of die-cast aluminum and that a rotary shaft R1 protrudes through the center. For example, the stator core C has a shape as shown in FIG. 10B as disclosed in Patent Document 1 (Japanese Unexamined Utility Model Publication No. H06-60284).

This stator core C is fabricated by layering the necessary number of magnetic plates each obtained by forming a portion to accommodate a rotor R to be rotatable in the center portion, magnetic pole portion C1, and a portion where stator coils are wound and arranged in a thin plate material C2 made of a magnetic material by press working with die-cutting. In addition, the rotor R is comprised of a magnetic rotor R2 and rotary shaft R1.

Further, in recent years, for example, Patent Document 2 (Japanese Unexamined Patent Publication No. 2004-266982) discloses an inner rotor type rotating electrical machine where the rotary shaft of the rotor is axially supported by a pair of front and rear cup-shaped brackets, magnets are disposed in the rotor to form NS magnetic poles in the rotation circumference direction, and stator coils are arranged in the shape of a circular ring around the periphery of the rotor. In the Document, a stator coil is wound around each of a plurality of divided cores via an insulator, the plurality of stator coils is held by a pair of cup-shaped brackets from the front and back of the rotary shaft, and circular magnetic teeth are formed. Then, each of a plurality of divided cores annularly arranged is fabricated by press-forming an electromagnetic steel plate, for example, a silicon steel plate into a desired shape, and layering the core pieces in a laminate form, and each stator core is thus prepared. The stator core is covered with an insulator and wound with the core, adjacent cores are fitted in a concavo-convex manner, and annular stator coils are formed.

Thus formed ring-shaped stator coils are fixed by a pair of cup-shaped brackets axially supporting the magnet rotor, and a structure of the rotating electrical machine is formed. By axially supporting the rotor rotary shaft by a pair of brackets, the magnet rotor is positioned, a plurality of stator cores is nipped by the pair of brackets, and ring-shaped stator coils are thereby arranged around the periphery of the rotor.

As described above, each of a plurality of magnetic pole portions protrudes toward the center in the stator core comprised of a single magnetic plate obtained by performing press working with die-cutting on a thin plate material made of a magnetic material as described previously. Accordingly, it is very difficult to wind the stator coil that is wound around the plurality of magnetic pole portions, and the automatic winding machine for automatically winding the coil is complicated and considerably expensive.

Therefore, in order to enable ordinary automatic winding machines to wind the stator coil with ease, each magnetic pole portion of the stator core is formed of a division core that is divided from one another, the stator coil is wound around each division core, and then, division cores are combined to form a single stator core.

However, when a stator core is formed of a plurality of division cores, the magnetic reluctance is high in the junction between division cores, a magnetic circuit is hard to form, and magnetic instability thereby occurs and becomes a factor of fluctuations in rotation.

Further, in arranging the stator coils around the magnet rotor in the shape of a ring as described previously, for the stator coils, it is general to prepare a plurality of stator cores corresponding to the magnetic teeth to arrange in the shape of a ring. For example, the number of stator cores is defined such that magnetic teeth corresponding to a multiple of 4 are formed in three-phase motors, each stator core is formed such that electromagnetic steel plates such as silicon steel plates are layered in a laminate form, the coil is wound around the periphery via an insulator, and end portions of the stator cores are coupled, for example, in a concavo-convex fit.

Figure 9:
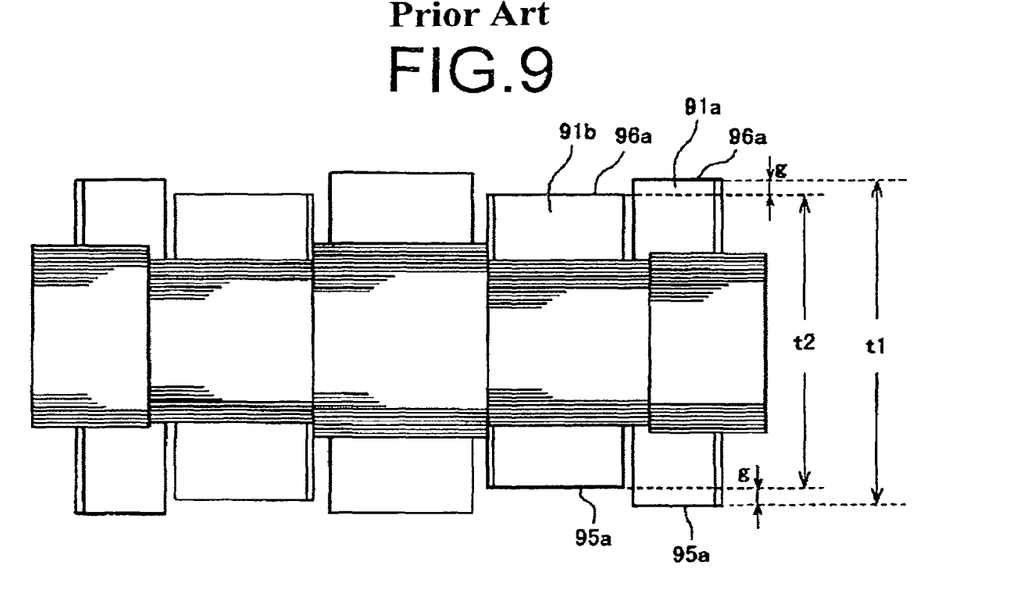
FIG. 9 is an explanatory view showing a conventional fixing structure of a stator core.

In the case of such a structure where a plurality of stator cores is coupled annularly to prepare the stator coils, and is sandwiched by a pair of brackets from the front and back of the rotary shaft, the thickness shape of each core becomes a problem. Referring to FIG. 7, since each stator core is configured by laminating a plurality of electromagnetic steel plates, it is extremely difficult to manufacture the stator core in a uniform thickness shape. In other words, as shown in FIG. 9, assuming that the laminate thickness of a first stator core 91$a$ is t1 and that the laminate thickness of a second stator core 91$b$ is t2, when the laminate thickness t1 and laminate thickness t2 are different from each other, a gap occurs in the struck surface 95$a$ of the first bracket and the struck surface 96$a$ of the second bracket. When the magnet rotor (not shown) rotates, each stator core rattles back and forth in the shaft direction due to the gap g, and noise and vibrations arise. Concurrently therewith, the magnetic forces of the magnetic teeth formed around the periphery of the rotor change, thereby resulting in a cause of fluctuations in rotation.

Therefore, conventionally, when such a plurality of stator cores is prepared, the thickness of the material plate of the electromagnetic steel plate, press-die structure, etc. are devised to uniform the thickness shape of each core, and the uniform thickness is thus secured. For example, when the rolled steel plate undergoes press die-cutting, die-cutting is performed along the rolling direction where fluctuations in material thickness are small, and its manufacturing is thus difficult and becomes a factor of high cost.

The present invention was made in view of the above-mentioned problems, and it is a first object of the invention to provide a stator structure and rotating electrical machine without generating noise and vibrations in action for enabling each core to be reliably fixed in arranging a plurality of cores annularly around the rotor to configure a stator even when the dimensional error occurs in manufacturing accuracy of each core.

Further, it is a second object of the invention to provide a stator structure and rotating electrical machine for enabling a plurality of cores to be fixed in a precise annular shape in alignment with one another in the shaft direction of the rotary shaft.

Furthermore, with attention directed toward a pair of end brackets nipping a stator core in a sandwich form in a rotating electrical machine such that a plurality of division cores is assembled and formed as a single stator core, it is a third object of the invention to provide a rotating electrical machine provided with stable rotation characteristics without fluctuations in rotation, by connecting magnetically division cores to one another using the end brackets and thereby eliminating magnetic instability.

BRIEF SUMMARY OF THE INVENTION

To attain the above-mentioned objects, in a rotating electrical machine of the invention, a plurality of stator cores each of a predetermined shape obtained by laminating electromagnetic steel plates is prepared corresponding to magnetic teeth, and the cores are nipped by a pair of first and second brackets arranged in the front and back in the rotary shaft direction. At this point, the first bracket member is provided with a first contact surface for striking one end face of a core to regulate, and the second bracket member is provided with a second contact surface for striking the other end face of the core to regulate. Then, the first contact surface constitutes a reference plane for aligning one end faces of a plurality of cores on the same plane, while the second contact surface is formed of a deformation surface deformable to follow the other end faces of the plurality of cores. By this means, the plurality of cores is aligned in their one end faces on the same plane (that is the plane perpendicular to the rotary shaft), while being pressed and supported in the other end faces by the deformation surface that deforms to follow the core dimension (thickness dimension), and is fixed reliably without rattling. The configuration will specifically be described below.

In a stator structure of a rotating electrical machine in which a plurality of magnetic teeth is formed around a magnet rotor, provided are a plurality of stator cores each obtained by laminating electromagnetic steel plates, winding coils wound around the stator cores via insulators, respectively, a pair of first and second bracket members that hold the plurality of stator cores from the front and back in the rotary shaft direction of the magnet rotor, and a fastening member that couples the first and second bracket members. In the first bracket member is formed a first contact surface for striking one end face of each of the stator cores to regulate so as to arrange the plurality of stator cores annularly, and in the second bracket is formed a second contact surface for striking the other end face of each of the stator cores to regulate. The first contact surface, constitutes a reference plane to align one end faces of the plurality of stator cores on the same plane, and the second contact surface is formed of a deformation surface deformable to follow the other end faces of the plurality of stator cores.

As the aforementioned deformation surface, for example, the second bracket member is formed of a material softer than the electromagnetic steel plates forming the stator cores, and the deformation surface is configured to cause elastic and plastic deformation by a fastening force for fastening the first and second bracket members using the fastening member.

Further, the first contact surface is formed in a plane shape coming into surface-contact with the end faces of cores, the second contact surface is formed in an inclined surface coming into line-contact with the end faces of cores, and thus, in fastening the first and second bracket members using the fastening member, the second contact surface deforms and is suited to the thickness shapes of the cores without the first contact surface deforms.

Furthermore, the above-mentioned rotating electrical machine has a pair of first and second bracket members opposed to each other, a magnet rotor having a rotary shaft axially supported by the pair of brackets, a stator supported by the pair of brackets to form a plurality of magnetic teeth around the periphery of the magnet rotor, and a fastening member that couples the pair of brackets, where the stator is comprised of a plurality of division cores, each obtained by laminating electromagnetic steel plates, arranged annularly around the magnet rotor, and winding coils wound around the division cores via insulators, respectively, and at least one of the pair of first and second brackets is formed of an annular magnetic material for magnetically coupling between division cores.

Still furthermore, outside ends of the plurality of division cores form an external wall of the machine, and part of each of the outside ends protrudes to form a cooling fin.

As described above, in the invention, in arranging a plurality of stator cores around the rotor annularly between the first and second bracket members to fix, one end face of each of the stator cores is positioned with reference to the first contact surface formed in the first bracket member, the other end face of each of the cores is fixed by the deformation surface formed in the second bracket that deforms to suit to the core dimension, and therefore, the invention has the effects as described below.

In a plurality of stator cores formed by laminating electromagnetic steel plates, their one end faces are regulated in position by the first contact surface and arranged in alignment with one another on the reference plane in the rotary shaft direction, and the other end faces are held by the second contact surface. At this point, the second contact surface deforms in accordance with the core dimension by the fastening force of the fastening member for coupling the first and second bracket members. By this means, the plurality of stator cores is aligned in their one end faces on the reference plane, and is pressed and supported in the other end faces by the deformation surface deforming corresponding to fluctuations in dimensional accuracy. Accordingly, a plurality of stator cores arranged annularly around the magnet rotor is reliably secured and supported between the first and second brackets, and each stator core does not rattle, and eliminates the fear of occurrence of noise and/or vibrations under action.

Further, in the invention, the second bracket member forming the deformation surface is made of a material softer than the stator core formed from electromagnetic steel plates, the deformation surface deforms to follow the core dimension by the fastening force of the fastening member, and it is thus possible to reliably fix a plurality of stator cores having dimensional differences without requiring specific processing.

Furthermore, the deformation surface is formed in the shape of an inclined positive-cone curbed surface, the vertex of the cone curbed surface is formed in the shape substantially in agreement with the shaft center of the rotary shaft, and it is thereby possible to arrange a plurality of stator cores in the shape of a positive cone with reference to the shaft center of the rotary shaft of the stator core. It is thus possible to bring shaft centers of the rotor and stator cores into agreement with each other.

Still furthermore, the invention is capable of providing a rotating electrical machine which is formed as a single stator core by combing a plurality of division cores, where at least one of a pair of end brackets nipping the stator core in a sandwich shape is formed of an annular magnetic material for coupling magnetically between division cores, and the division cores are magnetically connected to one another and thereby resolve magnetic instability, and which has stable rotation characteristics without fluctuations in rotation.

Moreover, as a result of coupling between division cores magnetically using the end bracket, the need is eliminated of wrapping and enclosing the division core with a yoke case, and the end faces of the division cores can be configured as an external wall of the machine. Then, by forming a cooling fin partially protruding through the outside end, heat generated inside the machine is spontaneously released with efficiency, and it is possible to reduce a heat loss and increase rotation efficiency.

DETAILED DESCRIPTION OF THE INVENTION

Figure 1:
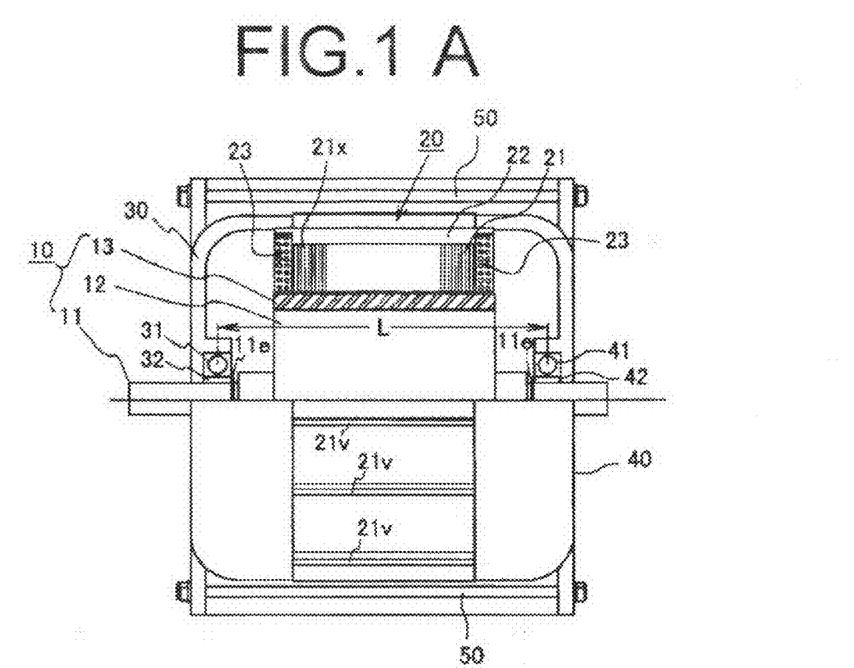
FIG. 1A is an explanatory view of a rotating electrical machine according to the invention and shows a longitudinal cross section.
FIG. 1B is another explanatory view of the rotating electrical machine according to the invention and is a perspective view of a core member.
FIG. 1C is still another explanatory view of the rotating electrical machine according to the invention and is a structural view of a core piece.

The present invention will specifically be described below based on preferred Embodiments. Described first is a configuration of a rotating electrical machine according to the invention. As shown in FIG. 1A, a rotating electrical machine (hereinafter, referred to as a motor) M is comprised of a rotor 10, stator 20, first bracket 30, second bracket 40, and external casing (not shown). The rotating electrical machine M shown in FIG. 1A indicates a brushless three-phase DG motor, and the invention will be described below according to the structure.

[Rotor Configuration]

The rotor 10 is comprised of a rotary shaft 11, a rotor core 12 integrally formed in the rotary shaft 11, and magnets 13 formed around the periphery of the rotor core 12. The rotary shaft 11 is comprised of a rod made of a metal material or the like with strength enduring a rotation load. For example, the rotor core 12 is configured by die-molding ferromagnetic metal powder such as iron powder, and is formed integrally in the rotary shaft 11. The magnets 13 are embedded around the periphery of the rotor core 12, and in the rotor shown in the figure, magnetic poles corresponding to a multiple of 3 are formed. As the magnetic poles, N-S poles are arranged alternately at regular intervals around the periphery of the rotor. The magnet 13 is formed from neodymium, ferrite, rare-earth cobalt or the like, and eight poles are arranged at regular intervals (45-degree intervals) around the rotor core 12 with the N poles and S poles alternately arranged.

[Stator Configuration]

The stator 20 is arranged annularly to surround the periphery of the rotor, and is formed by annularly coupling a plurality of division cores 21 (21a to 21l). Each of division cores 21a to 21l is wound with a winding coil 23 via an insulator 22. As described later, the division core 21 is formed by layering electromagnetic steel plates, for example, silicon steel plates obtained by adding silicon to iron, in a laminate form. Generally, a rolling steel plate subjected to rolling processing is cut and formed into a predetermined shape using a press die, and a core piece 21x is prepared. Then, a plurality of (for example, 50) core pieces 21x is layered in a laminate form to form a core member, the core member is fitted with the insulator 22, and the winding coil 23 is wound around the core member. The number of turns of the winding coil 23 is beforehand determined from a design value.

In this Embodiment as shown in the figure (see FIG. 2), the number of the above-mentioned division cores 21 is "12" (a multiple of 4 from the relationship with the three-phase DC motor), the cores are arranged annularly at 30-degree intervals, and each core piece 21x is wound with the winding coil 23a, 23b, . . . , or 23I via the insulator 22. In the 12 division cores 21, mutually opposed winding coils 23 with the same phase are coupled and connected, and three-phase division cores 21a, 21e and 21i are connected to input terminals T1, T2 and T3, respectively (see FIG. 2). Accordingly, the three-phase division cores 21a, 21e and 21i are required to be positioned in precise angle positions at 120-degree intervals around the rotor 10.

[Bracket Configuration]

The above-mentioned rotor 10 and stator 20 are fixed by a pair of first bracket 30 and second bracket 40. This pair of first and second brackets 30 and 40 are coupled to each other by fastening members (coupling belts in the FIG. 50 as shown in FIG. 1A, and fix the rotor 10 and stator 20 as described below.

First, the rotary shaft 11 of the rotor 10 is supported, in two front and back portions spaced a predetermined distance (distance L), rotatably by a bearing 31 provided in the first bracket 30 and a bearing 41 of the second bracket. Concurrently therewith, the bearings 31 and 41 are provided with steps 32 and 42, and the steps 32 and 42 regulate in position a positioning step (E-ring) 11e formed in the rotary shaft 11. By this means, the rotor 10 is regulated in position in the radial direction and thrust direction by the first and second brackets 30 and 40.

The above-mentioned first and second brackets 30 and 40 fix the stator 20 as described below. Described first is the structure of the stator 20. As described previously, the stator 20 is comprised of a plurality of division cores 21a to 21l (twelve in this Embodiment of the three-phase motor shown in the figure) and each division core is configured by forming an electromagnetic steel plate (for example, silicon steel plate) into an appropriate shape by die-cutting using a press die, and layering core pieces 21x in a laminate form. As shown in FIG. 1C, each of the core pieces 21x is formed in cross section in a substantially sector shape, and a plurality of (several tens of) pieces is layered in a laminate form and forms a single division core 21.

Then, a concave portion 21y and a convex portion 21z are formed in portions adjacent to each other, are fitted with each other, and are thus coupled in the shape of a chain. The core piece 21x is provided with a coil winding portion 21w and fringe portion 21v, and the winding coil 23 is wound around the winding portion 21w with the insulator 22 existing therebetween. Further, the fringe portion 21v is fixed to the first and second brackets 30 and 40.

Figure 3:
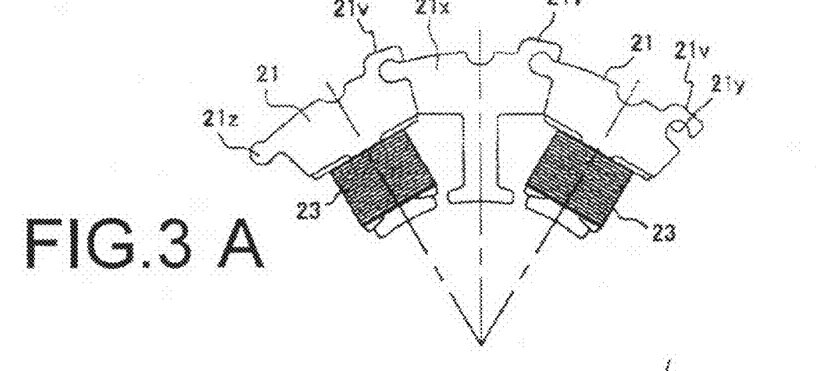
FIG. 3A is an explanatory view showing a structure of a division core and shows a coupling state of the division cores.
FIG. 3B is another explanatory view showing the structure of the division core and is an explanatory view of an angle reference plane of the division core.
FIG. 3C is still another explanatory view showing the structure of the division core and is a positioning configuration view by a first bracket in the division core.

Further, in the core piece as shown in the figure, an angle reference plane 21u is formed in the core piece 21x as shown in FIG. 3C. The angle reference plane 21u shown in the figure is provided in the convex portion formed in the fringe portion 21v of the core piece 21x, and engages with a positioning protrusion 34 formed in a first contact surface 33 of the first bracket 30 described later. By this means, a plurality of division cores 21a to 21l mutually coupled in the shape of a circular ring is positioned in angle positions defined by the first bracket 30 described later.

Furthermore, the above-mentioned division cores 21 are fixed to the first and second brackets 30 and 40 as described below. In one of the brackets (first bracket 30) is formed first contact surfaces 33 each for striking and regulating one end face (Sra shown in FIG. 4B) of the division core 21 obtained by layering the core pieces 21 in a laminate form. The first contact surfaces 33 are formed radially in the ring-shaped (circular) first bracket 30 corresponding to the number of division cores 21. Then, the first contact surface 33 is formed of a plane coming into surface-contact with one end face Sra of the division core 21.

In addition, each fringe portion 21v, which forms the convex portion protruding outward from each core piece 21x, protrudes from the external wall of the machine, thereby exerts the effect as a cooling fin, and is intended to spontaneously release heat generated inside the machine with efficiency, reduce a heat loss, and increase rotation efficiency.

Further, the first bracket 30 is provided with the positioning protrusion 34 for defining in position the angle position (that is the angle position in the rotor rotation direction) of the division core 21. The positioning protrusion 34 is provided in three portions at 120-degree regular intervals from the relationship that the apparatus shown in the figure is a three-phase motor, and this position is aligned with the angle reference plane 21u of the division core 21 as described previously.

Meanwhile, in the other bracket (second bracket 40) are formed second contact surfaces 43 each for striking and regulating the other end face (Srb shown in FIG. 4B) of the division core 21. The second contact surfaces 43 are also formed radially in the second bracket 40 of annular cross section corresponding to the number of division Cores 21. With respect to the second contact surfaces 43, Embodiment 1 is shown in FIGS. 5A and 5B, and Embodiment 2 is shown in FIG. 6.

[Configurations of the First and Second Brackets]

Figure 5:
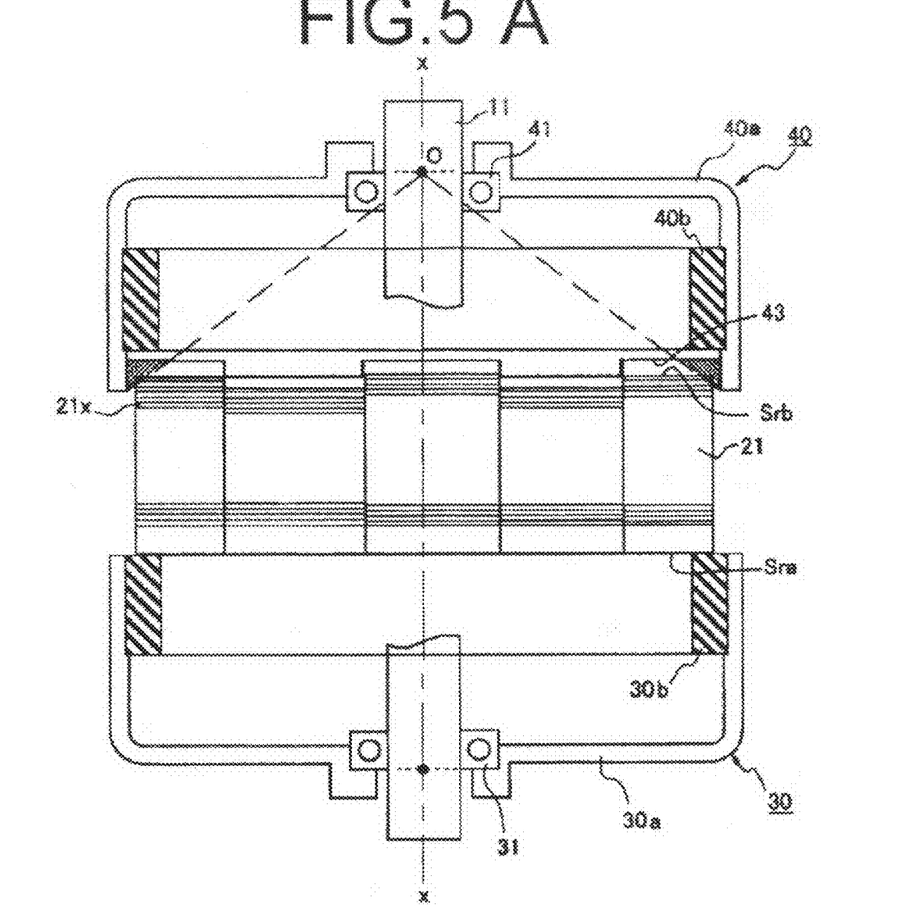
FIG. 5A is an explanatory view showing Embodiment 1 of a second bracket in FIG. 4B and shows a longitudinal cross section of the second bracket.
FIG. 5B is another explanatory view showing Embodiment 1 of the second bracket in FIG. 4B and is an enlarged view of a second contact surface of the second bracket.
Figure 6:
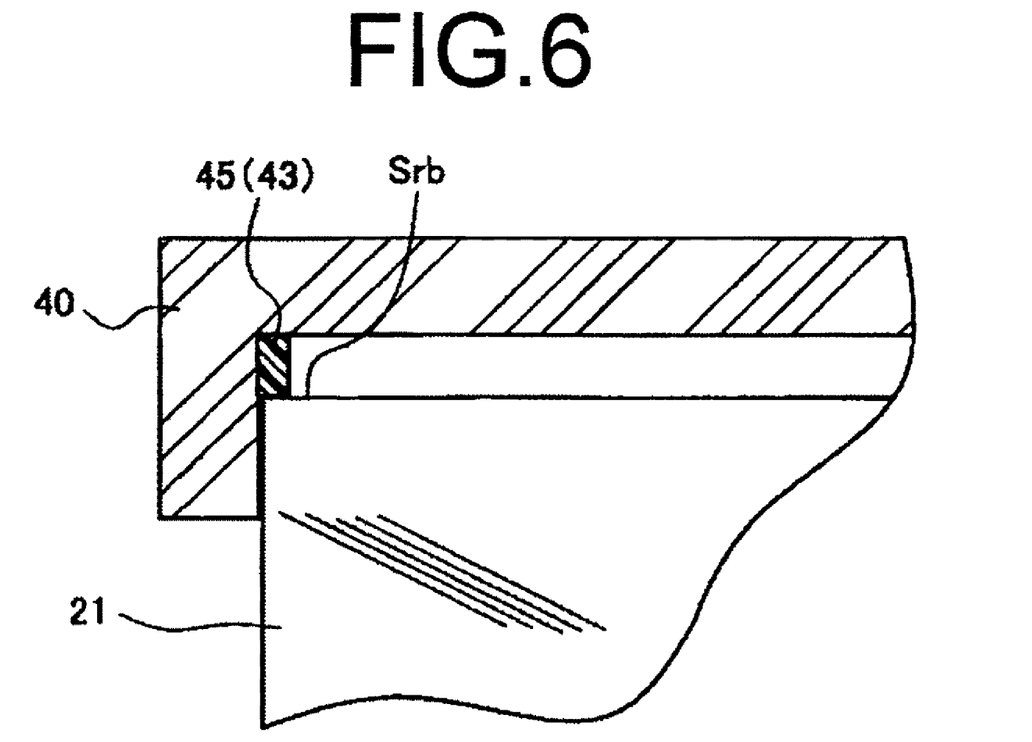
FIG. 6 is an explanatory view showing Embodiment 2 of the second bracket different from FIG. 5B.

First, as shown in FIG. 5A, the first bracket 30 is comprised of a structure such that a bracket cover 30a formed by aluminum die-cast is fitted with an annular ring body (first magnetic member) 30b made of a magnetic material coming into contact with the bottoms of the division cores 21 to hold. The annular ring body 30b forms magnetic loops with the division cores 21 to form the machine external wall portion so as to obtain the cooling effect, thereby intending magnetic stabilization of the division cores 21. Similarly, the second bracket 40 is comprised of a structure such that a bracket cover 40a formed by aluminum die-cast is fitted with an annular ring body (second magnetic member) 40b made of a magnetic material in a position facing the tops of the division cores 21. This annular ring body 40b is spaced a distance apart from the division cores 21 in a position which does not undergo the effect of fluctuations in dimension among the division cores 21 to form the machine external wall portion so as to obtain the cooling effect in machine assembly and which undergoes the magnetic action, and forms a magnetic loop with each division core 21, thereby intending magnetic stabilization of the division cores 21. In addition, the first and second bracket covers 30a and 40a and the annular ring bodies (first and second magnetic members) 30b and 40b are formed separately, respectively, but may be formed from integral members made of a magnetic material. Alternately, depending on to the magnetic action, one of the first and second bracket covers 30a and 40a may be provided with a magnetic body or an annular ring body made of or a magnetic material.

[Magnetic Action of the First and Second Brackets]

Figure 7A:
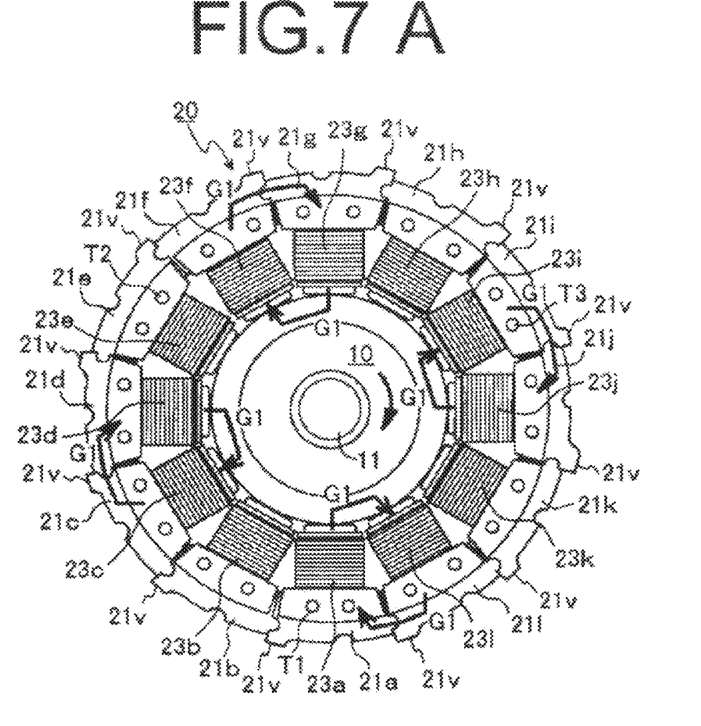
FIG. 7A contains an explanatory view of a magnetic circuit configuration by division cores and brackets.
Figure 7B:
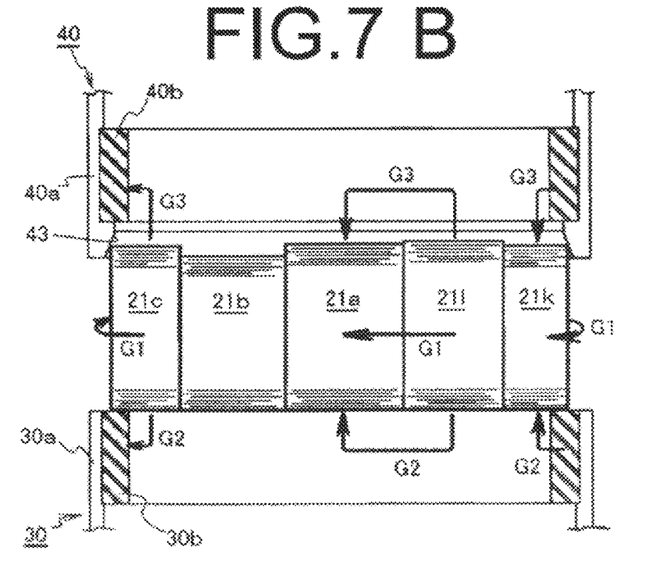
FIG. 7B contains another explanatory view of a magnetic circuit configuration by division cores and brackets.

By thus forming each of the first bracket 30 and second bracket 40 using the magnetic material, in the case of three-phase driving, as shown in FIG. 7A, the current is supplied to winding coils 23 of two adjacent division cores 21, each division core 21 is excited, and as a result, the rotor 10 is pulled by excited magnetic poles and rotates in the arrow direction. In a state as shown in the figure, for example, the S pole is excited in the face facing the rotor 10 of the division core 21l, the N pole is excited in the external wall face thereof, while the N pole is excited in the face facing the rotor 10 of the adjacent division core 21a and the S pole is excited in the external wall face thereof, and a first magnetic loop G1 is formed. At the same time, as shown in FIG. 7B, a magnetic flux coming out of the division core 21l enters the division core 21a through the annular ring body 30b that is the magnetic material of the first bracket 30, the magnetic flux coming out of the division core 21a returns to the division core 21l through the rotor 10, and a second magnetic loop G2 is thus formed. Similarly, a magnetic flux coming out of the division core 21l enters the division core 21a through the annular ring body 40b that is the magnetic material of the second bracket 40, the magnetic flux coming out of the division core 21a returns to the division core 21l through the rotor 10, and a third magnetic loop G3 is thus formed. As described above, as compared with the case of generally forming the magnetic loop only using the magnetic loop G1, in this configuration, the magnetic loop G2 and third magnetic loop G3 are formed, the magnetic path increases, and as a result, a magnetic flux leaking outside the machine remarkably decreases. Accordingly, it is possible to resolve magnetic instability and rotate the rotor 10 smoothly.

[Performance and Characteristics by the Magnetic Brackets]

Figure 8:
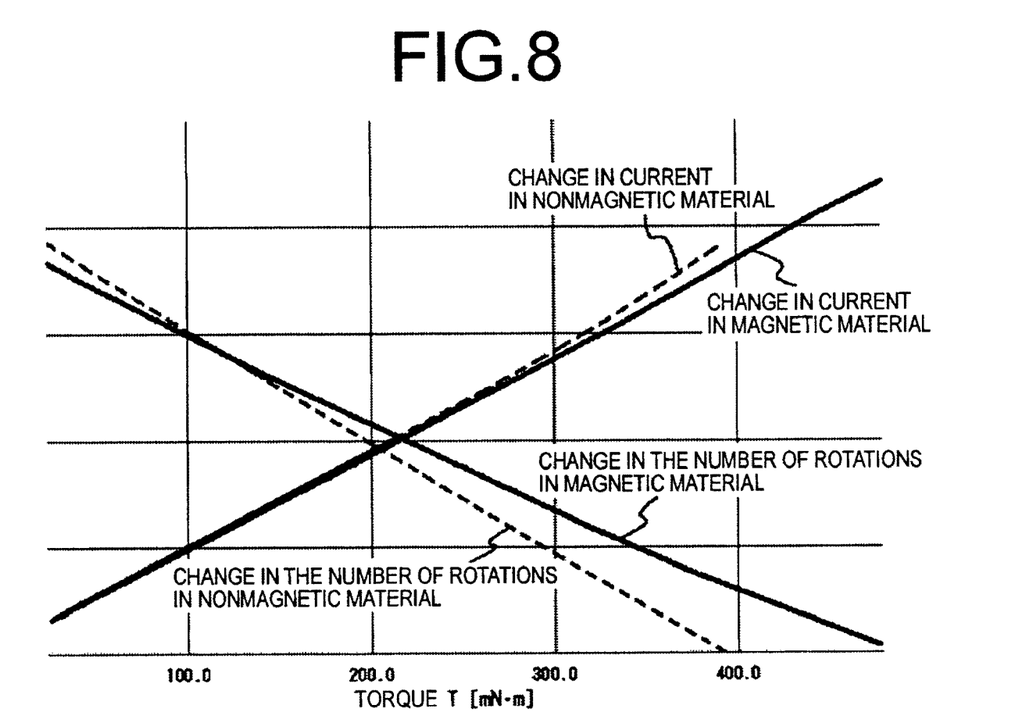
FIG. 8 is a graph showing characteristic comparison of the rotating electrical machine of the invention.

Actually, as indicated in the characteristic graph shown in FIG. 8, as compared with the case where the first and second brackets 30 and 40 are made of a nonmagnetic material, a change in current passed through the division core 21 is of an almost linear characteristic, and a linear area width of rotation torque is also wider.

[Embodiment 1 of the Second Bracket]

Further, with respect to the second bracket 40, the second contact surfaces 43 are formed in the second bracket 40 as shown in FIG. 5A as described below. The second contact surface 43 is formed in the shape of a ring in an inclined surface in line-contact with the other end face Srb of the division core 21. In other words, the edge of the other end face Srb of the division core 21 comes into contact, in an acute angle, with the inclined surface in the shape of a circular truncated cone formed in the bracket. Concurrently therewith, in contrast to the division cores 21 formed of electromagnetic steel plates (silicon steels, etc.) as described previously, the second contact surfaces 43 are made of a soft metal material or resin material (aluminum alloy in the figure). Thus, the second contact surfaces 43 formed in the second bracket 40 are made of a material which undergoes the fastening force of fastening members 50 described later, and thereby deforms to be crushed to the edge portion of the division core 21.

As described above, the second contact surface 43 is formed in the shape of a ring in the inclined surface, and is radially arranged such that the inclined surface shown in the figure has the shape of a positive circular truncated cone as shown in FIG. 5A, and that the vertex O coincides with the shaft center x-x of the rotary shaft 11 supported by the bearing 41. The reason is to prevent magnetic teeth from been biased when a plurality of division cores 21a to 21l are pressed by the contact surfaces 43 of the second bracket 40 as described later, by arranging the division cores equidistantly around the shaft center x-x of the rotary shaft as the center.

[Embodiment 2 of the Second Bracket]

Further, the second contact surfaces 43 are formed in the second bracket 40 as shown in FIG. 6 as described below. The second contact surface 43 is formed of a spacer member 45 attached to the second bracket (metal material) 40, and the spacer member 45 comes into surface-contact with the other end face Srb of the division core 21. Then, the spacer member 45 is made of a resin material provided with magnetic characteristics which is obtained by adding a magnetic material and which deforms with ease by the fastening force of the fastening members 50 acted on the other end face Srb of the division core 21. Accordingly, by forming the magnetic loop by the magnetic characteristics, it is possible to resolve magnetic instability due to the division cores 21, and even when dimensional fluctuations occur in a plurality of division cores 21a to 21l annularly arranged, due to the characteristics of being de formable with ease, the contact surface deforms to follow the core end face, and does not cause a gap therebetween.

As described above, the first and second brackets 30 and 40 for merging the rotor 10 and stator 20 are integrated by the fastening members (coupling belts) 50, and the distance L is determined by the thickness dimension of the division core 21. Then, a cylindrical yoke not shown is used to wrap, and the housing of the rotating electrical machine is thus formed.

The action of the invention is described next. As shown in FIG. 1A, the rotor 10 is comprised of the rotary shaft 11 and magnets 13 as described previously, and magnetic poles of the N poles and S poles are alternately arranged around the periphery of the rotor core 12. In the rotor 10, the rotary shaft 11 is supported rotatably by the bearings 31 and 41 of the first and second brackets 30 and 40 integrated by the fastening members 50. By this means, the rotor 10 is supported to rotate the magnetic poles formed from the magnets 13 of the rotor 10 in a predetermined circular locus. Concurrently therewith, the shaft-direction (thrust-direction) position of the rotor 10 is positioned and supported by the E-ring 11e in the steps 32 and 42 of the rotary shaft 11.

Figure 2:
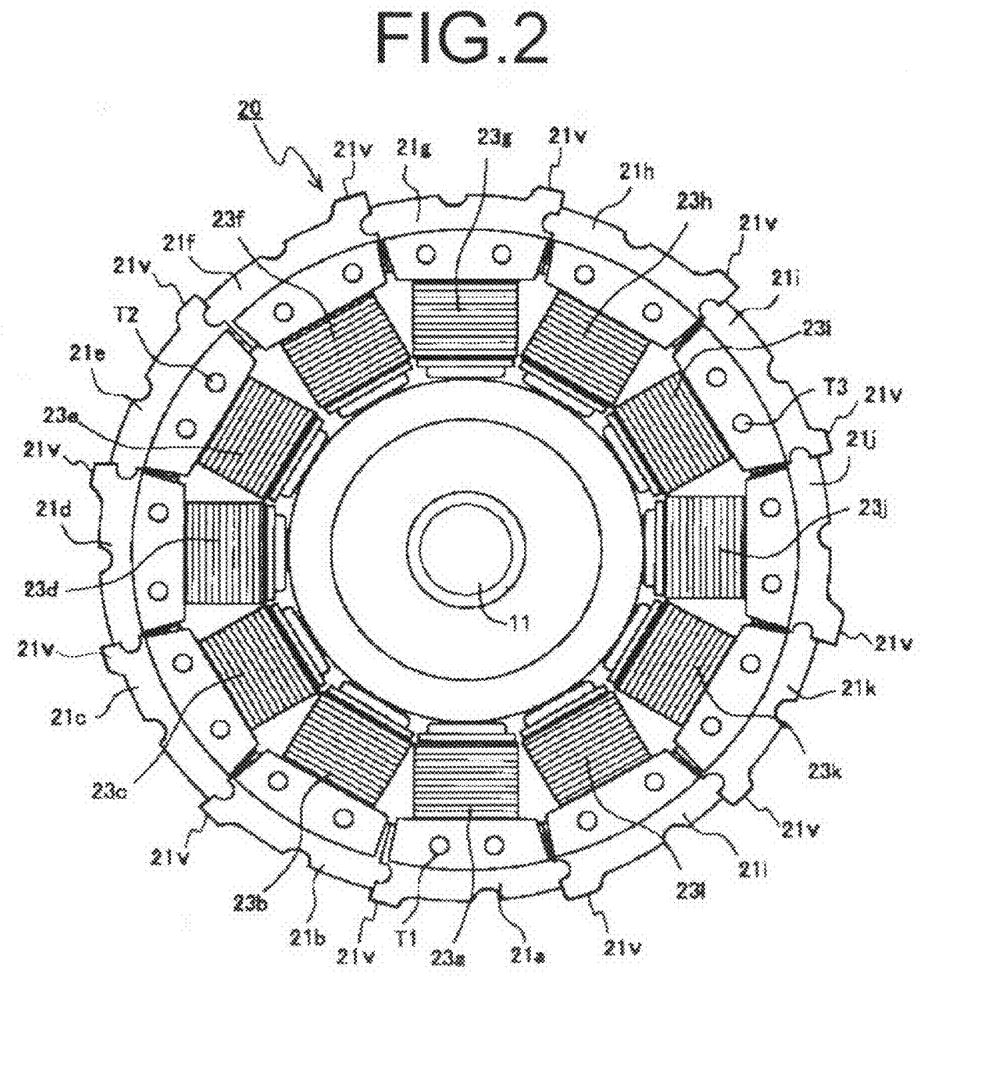
FIG. 2 is a structural explanatory view of a stator as shown in FIG. 1.
Figure 4:
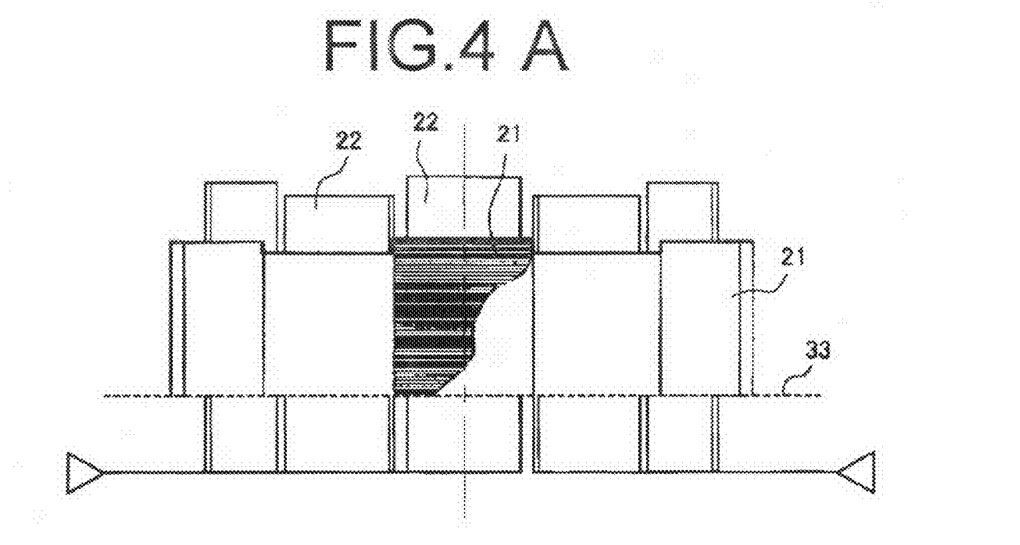
FIG. 4A is an enlarged view of the division core laminate chain-shape bracket support as shown in FIG. 1A.
FIG. 4B is another enlarged view of the division core laminate chain-shape bracket support as shown in FIG. 1A.

The above-mentioned stator 20 is comprised of a plurality of division cores 21a to 21l as shown in FIG. 2, and the division cores 21a to 21l are annularly coupled by fitting and coupling the concave portions 21y and convex portions 21z formed in the core pieces 21x. Then, as shown in FIGS. 4B and 5A, the division cores 21a to 21l are annularly arranged in their one end faces Sa with reference to the first contact surfaces 33 of the (annular ring body (first magnetic member) 30b) first bracket 30. At this point, in the chained division cores 21, the angle reference planes 21u are matched with the positioning protrusions 34 of the first bracket 30. By this means, it is possible to position and arrange a plurality of division cores 21a to 21l so that the end faces Sra are aligned on the same plane, and concurrently, it is possible to locate angle positions of a plurality of annularly chained division cores 21 in predetermined positions.

Further, as shown in FIG. 5A, the other end faces Srb of the above-mentioned division cores 21 are pressed and supported by the second contact surfaces 43 of the second bracket 40. At this point, since the second contact surface 43 is formed of the inclined surface (Embodiment 1) or the spacer member (Embodiment 2), and is made of the material softer than the electromagnetic steel plates forming the division cores 21, even when fluctuations occur in the thickness dimension among a plurality of division cores 21a to 21l, the second contact surface 43 deforms, and neither a gap nor rattle arises between the surface 43 and the other end face Srb of the division core 21.

Furthermore, the second contact surface 43 is formed of the inclined surface, and the inclined surface is in the shape of a positive cone where the vertex O coincides with the shaft center x-x of the rotary shaft 11. By this means, it is possible to arrange a plurality of division cores 21a to 21l radially around the shaft center x-x of the rotary shaft 11 as the center. This arrangement is automatically aligned by fastening a pair of the first and second brackets 30 and 40 using the fastening members 50.

The present invention relates to a stator structure of electromagnetic motors, generators, etc. and rotating electrical machines using the stator structure, and to improvements in a fixing structure of a stator provided with coils, and has industrial applicability.

In addition, this application claims priority from Japanese Patent Applications No. 2009-070694 and No. 2009-270901 incorporated herein by reference.

What is claimed is:
1. A stator structure of a rotating electrical machine, comprising:
   a magnet rotor;
   a plurality of magnetic teeth formed around the magnet rotor;
   a plurality of division cores each obtained by laminating electromagnetic steel plates;
   winding coils wound around the division cores via insulators, respectively;

a pair of first and second bracket members that hold the plurality of division cores from front and back in a rotary shaft axial direction of the magnet rotor; and a fastening member that couples the first and second bracket members, wherein in the first bracket member is formed a first contact surface for striking one end face of each of the division cores to regulate so as to arrange the plurality of division cores annularly, in the second bracket is formed a second contact surface for striking other end face of each of the division cores to regulate, the first contact surface is a flat surface surface-contacting with one end face of each of the plurality of division cores and constitutes a reference plane to align the one end face of each of the plurality of division cores on a same plane, and the second contact surface is an inclined surface line-contacting with an edge of another end face of each of the plurality of division cores and formed of a deformation surface deformable to follow the other end face of each of the plurality of division cores.

2. The stator structure of a rotating electrical machine according to claim 1, wherein the second contact surface is formed of a material softer than the electromagnetic steel plates of the division cores, and is deformable to follow the end faces of the plurality of division cores by a fastening force of the fastening member.

3. The stator structure of a rotating electrical machine according to claim 2, wherein
the first contact surface is formed in a shape of a ring, and
the second contact surface is formed in a shape of a ring.

4. The stator structure of a rotating electrical machine according to claim 3, wherein the inclined surface in the shape of the ring is formed in a positive cone curved surface having a vertex in a shaft center of the rotary shaft of the magnet rotor.

5. The stator structure of a rotating electrical machine according to claim 1, wherein in the first contact surface is formed an angle reference plane to regulate an angle position of at least one of the plurality of division cores, and by striking the one end face of the division core against the angle reference plane to regulate, the plurality of division cores is positioned in predetermined angle positions in the rotation direction of the rotary shaft.

6. A rotating electrical machine comprising:
a pair of first and second bracket members opposed to each other;
a magnet rotor having a rotary shaft axially supported by the pair of brackets;
a stator supported by the pair of brackets to form a plurality of magnetic teeth around a periphery of the magnet rotor; and
a fastening member that couples the pair of brackets,
wherein the stator comprises a plurality of division cores, each obtained by laminating electromagnetic steel plates, arranged annularly around the magnet rotor, and winding coils wound around the division cores via insulators, respectively,
the plurality of division cores is annularly arranged while being regulated in positions in one end face of each of the division cores by a first contact surface formed in the first bracket and another end face of each of the division cores by a second contact surface formed in the second bracket,
the first contact surface is a flat surface surface-contacting with one end face of each of the plurality of division cores and has a reference plane to align the one end face of each of the plurality of division cores on a same plane, and
the second contact surface is an inclined surface line-contacting with an edge of the another end face of each of the plurality of division cores and has a deformation surface deformable to follow the other end faces of the plurality of division cores.

7. The rotating electrical machine according to claim 6, wherein
at least one of the pair of first and second brackets is formed of a ring-shaped magnetic material for magnetically coupling between the division cores.

8. The rotating electrical machine according to claim 7, wherein at least one of the pair of first and second brackets is integrally formed using a magnetic material.

9. The rotating electrical machine according to claim 7, wherein at least one of the pair of first and second brackets formed of the magnetic material comprises a bracket body and a ring-shaped magnetic member fitted with the bracket body.

10. The rotating electrical machine according to claim 7, wherein
outside ends of the plurality of division cores form an external wall of the machine, and part of each of the outside ends protrudes to form a cooling fin.

11. The rotating electrical machine according to claim 1, wherein an extension line of the inclined surface connects between a top center of the second bracket and the edge of the other end faces of the plurality of division cores.

12. The rotating electrical machine according to claim 6, wherein an extension line of the inclined surface connects between a top center of the second bracket and the edge of the other end faces of the plurality of division cores.

* * * * *